(12) United States Patent  (10) Patent No.: US 8,953,890 B2
Yassin  (45) Date of Patent: Feb. 10, 2015

(54) USAGE OF VISUAL READER AS AN INPUT PROVIDER IN PORTALS

(75) Inventor: Ohad Yassin, Tel Mond (IL)

(73) Assignee: SAP SE, Walldorf (DE)

( * ) Notice: Subject to any disclaimer, the term of this patent is extended or adjusted under 35 U.S.C. 154(b) by 395 days.

(21) Appl. No.: 13/323,946

(22) Filed: Dec. 13, 2011

(65) Prior Publication Data

US 2013/0148891 A1  Jun. 13, 2013

(51) Int. Cl.
 *G06K 9/46* (2006.01)
(52) U.S. Cl.
 USPC .......................................................... 382/190
(58) Field of Classification Search
 USPC ................................ 382/190, 305
 See application file for complete search history.

(56) References Cited

U.S. PATENT DOCUMENTS

2006/0251339 A1* 11/2006 Gokturk et al. ............... 382/305

* cited by examiner

*Primary Examiner* — Duy M Dang
(74) *Attorney, Agent, or Firm* — Fish & Richardson P.C.

(57) ABSTRACT

The present disclosure involves computer-implemented methods, software, and systems for providing information to a business application using captured image information. A computer-implemented method includes receiving, using at least one computer, image information, wherein the image information contains business object identifying data, analyzing the received image information to retrieve the business object identifying data, identifying at least one business object corresponding to the retrieved business object identifying data, retrieving business object information associated with the identified at least one business object from a memory, and transmitting the retrieved business object information to at least one business application.

23 Claims, 3 Drawing Sheets

USAGE OF VISUAL READER AS AN INPUT PROVIDER IN PORTALS

TECHNICAL FIELD

The present disclosure relates to computer-implemented methods, software, and systems for providing information to a business application using captured image information.

BACKGROUND

Business applications in a portal often require the entry of identifying data in order to select a business object instance out of a list or repository of business objects associated with a business process. The entry of identifying data is usually performed manually, a cumbersome and repetitive process that is error prone, inefficient, and wasteful of business resources. Simplified, error-free entry of business object identifying data is essential for efficient and cost-effective management of business object instances as well as to ensure data integrity, consistency, and security.

SUMMARY

The present disclosure relates to computer-implemented methods, software, and systems for providing information to a business application using captured image information. One computer-implemented method includes receiving, using at least one computer, image information, wherein the image information contains business object identifying data, analyzing the received image information to retrieve the business object identifying data, identifying at least one business object corresponding to the retrieved business object identifying data, retrieving business object information associated with the identified at least one business object from a memory, and transmitting the retrieved business object information to at least one business application.

While generally described as computer-implemented software embodied on a non-transitory computer readable storage device that processes and transforms respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

DESCRIPTION OF DRAWINGS

Like reference numbers and designations in the various drawings indicate like elements.

DETAILED DESCRIPTION

The disclosure generally describes computer-implemented methods, software, and systems for providing information to a business application using captured image information. Specifically described are computer-implemented methods, software, and systems for supporting the capture of image information using a mobile device camera, analyzing the image information, retrieving business object information associated with the image information from a memory, and providing the retrieved business object information to at least one business application.

Previously, the entry of identifying data (e.g., serial number, location, etc.) for a business object instance into, for example a portal, was a time-consuming, cumbersome, and repetitive process, especially due to inherent limitations of manual data entry. The advantages of the present disclosure are numerous. First, using a mobile device camera to capture image information and processing the image information to retrieve the business object identifying data is efficient, virtually error-free, and mitigates repetitive and cumbersome manual data entry. Second, data integrity and security are enhanced by removing manual data entry actions. Further, the efficient retrieval of business object information associated with the identifying data allows quick selection of a business object instance from a list (e.g., sales orders, receipts, invoices, merchandise, persons, etc.). The application of the selection to several business applications in parallel also provides overall data consistency.

Figure 1:
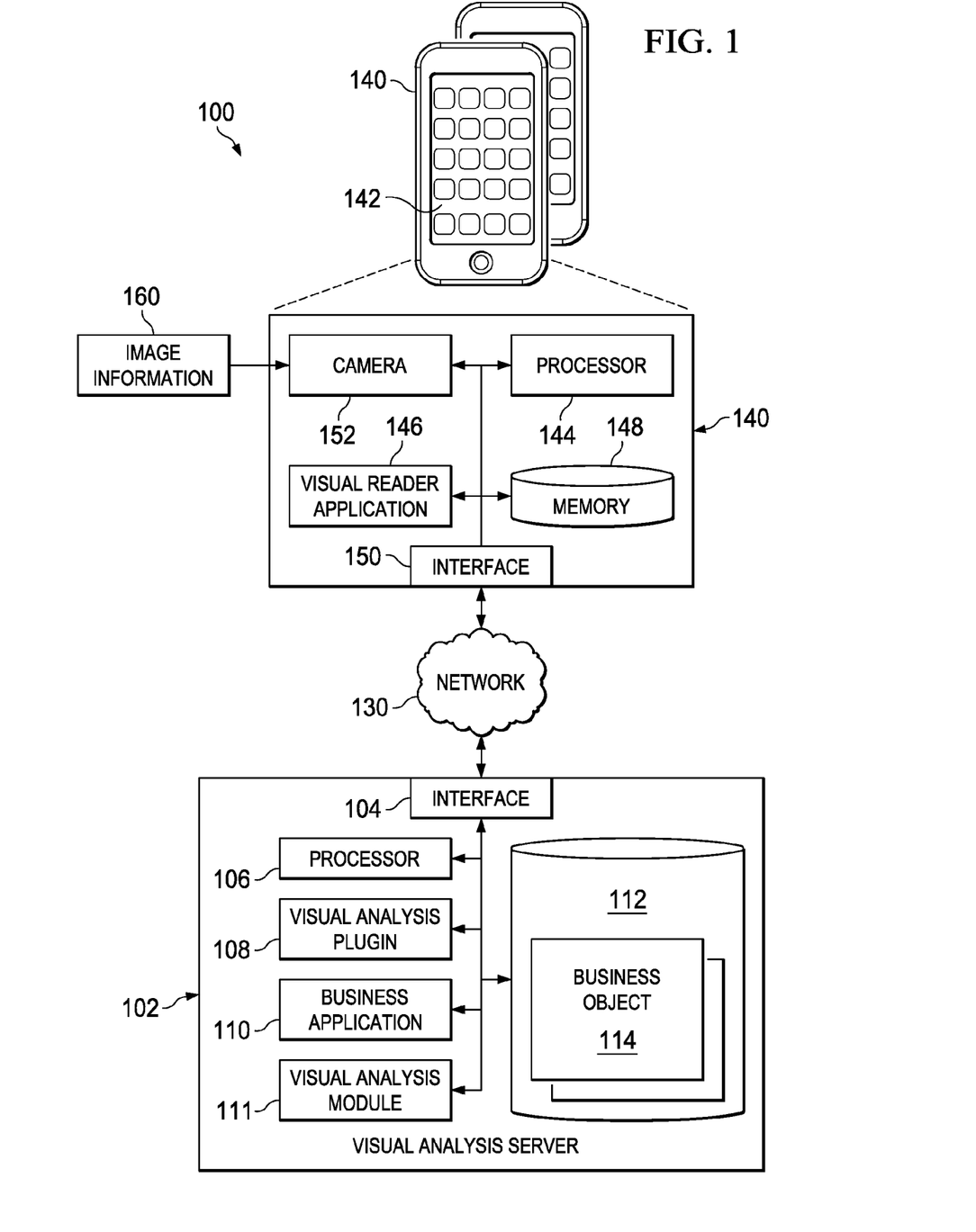
FIG. 1 illustrates an example system for providing information to a business application using captured image information.

Referring to FIG. 1 an example image information capture and analysis system 100 is shown. The illustrated example environment 100 includes, or is communicably coupled with, a visual analysis server 102, a network 130, and at least one client 140. The visual analysis server 102 and the at least one client 140 may communicate across or via network 130. In general, example environment 100 depicts an example configuration of a system for supporting the provision of information to a business application using captured image information. In alternative implementations, the elements illustrated within the visual analysis server 102 and/or the at least one client 140 may be included in or associated with different and/or additional servers, clients, networks, or locations other than those illustrated in FIG. 1. Additionally, the functionality associated with the visual analysis server 102 may be associated with any suitable system, including by adding additional instructions, programs, applications, or other software to existing systems. For example, the components illustrated within the visual analysis server 102 may be included in multiple servers, cloud-based networks, or other locations accessible to the visual analysis server 102 (e.g., either directly or via network 130).

In general, the visual analysis server 102 is any server that supports providing information to a business application 110 using captured image information and a visual analysis plugin 108. For example, each visual analysis server 102 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). In some implementations, other non-Java based servers and or systems could be used for the visual analysis server 102. In some implementations, each visual analysis server 102 may store a plurality of various other applications (not illustrated), while in other implementations, each visual analysis server 102 may be a dedicated server meant to store and execute a particular visual analysis plugin 108 and its related functionality, as well as a set of particular visual analysis plugins 108. In some implementations, the visual analysis server 102 may comprise a web server or be communicably coupled with a web server, where the particular visual analysis plugin 108 associated with that visual analysis server 102 represents web-based (or web-accessible) applications accessed and executed on an associated at least one client 140 to perform the programmed tasks or operations of the corresponding visual analysis plugin 108.

At a high level, the visual analysis server 102 comprises an electronic computing device operable to receive, transmit, process, store, or manage data and information associated with the example environment 100. The visual analysis server 102 illustrated in FIG. 1 can be responsible for receiving application requests and/or data from at least one client 140 (as well as any other entity or system interacting with the visual analysis server 102), responding to the received requests by analyzing processing said requests in an associated visual analysis module 111 and/or visual analysis plugin 108, and sending appropriate responses back to the requesting client 140 or other requesting system. The visual analysis module 111 and/or visual analysis plugin 108 can also process and respond to local requests from a user locally accessing the associated visual analysis server 102. Accordingly, in addition to requests and/or data from the external clients 140 illustrated in FIG. 1, requests associated with a particular visual analysis module 111, visual analysis plugin 108, and/or business application 110 may also be sent from internal users, external or third-party customers, as well as any other appropriate entities, individuals, systems, or computers. In some implementations, the visual analysis module 111 and/or visual analysis plugin 108 can be a Web-based application executing functionality associated with a local or remote networked or cloud-based business process (not illustrated).

As used in the present disclosure, the term "computer" is intended to encompass any suitable processing device. For example, although FIG. 1 illustrates a single visual analysis server 102, example environment 100 can be implemented using any number of servers, as well as computers other than servers, including a server pool. Indeed, the visual analysis server 102 may be any computer or processing device such as, for example, a blade server, general-purpose personal computer (PC), Macintosh, workstation, Unix/Linux-based workstation, tablet computer, or any other suitable device. In other words, the present disclosure contemplates computers other than general purpose computers, as well as computers without conventional operating systems. Further, the illustrated visual analysis server 102 may be adapted to execute any physical or virtual operating system, including Unix, Linux, Windows, Mac OS, WebOS, iOS, Android, or any other suitable operating system.

In the illustrated implementation of FIG. 1, the visual analysis server 102 includes an interface 104, a processor 106, a visual analysis plugin 108, a business application 110, a visual analysis module 111, and a memory 112. While illustrated as a single component in the example environment 100 of FIG. 1, alternative implementations may illustrate the visual analysis server 102 as comprising multiple or duplicate parts or portions accordingly.

The interface 104 is used by the visual analysis server 102 to communicate with other systems in a client-server or other distributed environment (including within example environment 100) connected to the network 130 (e.g., an associated client 140, as well as other systems communicably coupled to the network 130). FIG. 1 depicts a client-server environment, but could also represent a cloud-computing network. Various other implementations of the illustrated example environment 100 can be provided to allow for increased flexibility in the underlying system, including multiple visual analysis servers 102 performing or executing at least one additional or alternative implementation of the visual analysis plugin 108. In those implementations, the different visual analysis servers 102 may communicate with each other via a cloud-based network or through the connections provided by network 130. Returning to the illustrated example environment 100, the interface 104 generally comprises logic encoded in software and/or hardware in a suitable combination and operable to communicate with the network 130. More specifically, the interface 104 may comprise software supporting at least one communication protocol associated with communications such that the network 130 or the interface's hardware is operable to communicate physical signals within and outside of the illustrated example environment 100.

Generally, the visual analysis server 102 may be communicably coupled with a network 130 that facilitates wireless or wireline communications between the components of the example environment 100 (i.e., between the visual analysis server 102 and the at least one client 140), as well as with any other local or remote computer, such as additional clients, servers, or other devices communicably coupled to network 130, including those not illustrated in FIG. 1. In the illustrated example environment 100, the network 130 is depicted as a single network, but may be comprised of more than one network without departing from the scope of this disclosure, so long as at least a portion of the network 130 may facilitate communications between senders and recipients. In some implementations, at least one component associated with the visual analysis server 102 can be included within the network 130 as at least one cloud-based service or operation. The network 130 may be all or a portion of an enterprise or secured network, while in another implementation, at least a portion of the network 130 may represent a connection to the Internet. In some implementations, a portion of the network 130 can be a virtual private network (VPN). Further, all or a portion of the network 130 can comprise either a wireline or wireless link. Example wireless links may include cellular, 802.11a/b/g/n, 802.20, WiMax, and/or any other appropriate wireless link. In other words, the network 130 encompasses any internal or external network, networks, sub-network, or combination thereof operable to facilitate communications between various computing components inside and outside the illustrated example environment 100. The network 130 may communicate, for example, Internet Protocol (IP) packets, Frame Relay frames, Asynchronous Transfer Mode (ATM) cells, voice, video, data, and other suitable information between network addresses. The network 130 may also include at least one local area network (LAN), radio access network (RAN), metropolitan area network (MAN), wide area network (WAN), all or a portion of the Internet, and/or any other communication system or systems in at least one location. In some implementations, the network 130 can include encryption and/or decryption capability enabling secure data transmission. The network 130, however, is not a required component in some implementations of the present disclosure.

As illustrated in FIG. 1, the visual analysis server 102 includes a processor 106. Although illustrated as a single processor 106 in the visual analysis server 102, two or more processors may be used in the visual analysis server 102 according to particular needs, desires, or particular implementations of example environment 100. The processor 106 may be a central processing unit (CPU), a blade, an application specific integrated circuit (ASIC), a field-programmable gate array (FPGA), or another suitable component. Generally, the processor 106 executes instructions and manipulates data to perform the operations of the visual analysis server 102 and, specifically, the functionality associated with the corresponding visual analysis plugin 108 and business application 110. In one implementation, the visual analysis server 102 processor 106 executes the functionality required to also receive and respond to requests, instructions, and data from the at least one client 140.

Regardless of the particular implementation, "software" may include computer-readable instructions, firmware, wired or programmed hardware, or any combination thereof on a tangible and non-transitory medium operable when executed to perform at least the processes and operations described herein. Indeed, each software component may be fully or partially written or described in any appropriate computer language including C, C++, C#, Java, Visual Basic, assembler, Perl, a 4GL, as well as other suitable computer languages. It will be understood that while portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate. In some implementations, software can be a Web service consumed via any means of communication. In the illustrated example environment 100, each processor 106 executes visual analysis plugin 108 and business application 110 stored on the associated visual analysis server 102. In other implementations, a particular visual analysis server 102 can be associated with the execution of two or more visual analysis plugins 108 and/or business applications as well as at least one distributed application (not illustrated) executing across two or more visual analysis servers 102.

The visual analysis server 102 includes a memory 112 for storing data and program instructions. The memory 112 may include any memory or database module and may take the form of volatile or non-volatile memory including, without limitation, magnetic media, optical media, random access memory (RAM), read-only memory (ROM), flash memory, removable media, or any other suitable local or remote memory component. The memory 112 may store various objects or data, including classes, frameworks, applications, backup data, business objects, business process models, jobs, Web pages, Web page templates, database tables, process contexts, repositories storing services local to the visual analysis server 102, and any other appropriate information including any parameters, variables, database queries, algorithms, instructions, rules, constraints, or references thereto associated with the purposes of the visual analysis server 102 and its visual analysis plugin 108 and/or business application 110. As illustrated in FIG. 1, memory 112 includes at least one business object 114 instance. In some implementations, including a cloud-based system, some or all of the memory 112 can be stored remote from the visual analysis server 102, and communicably coupled to the visual analysis server 102 for usage.

In some implementations, the at least one business object 114 represents a type of entity inside a business layer in an n-layered object-oriented architecture that holds a set of attributes, methods, and associations with other business objects 114. For example, for a "Company" business object, attributes may include "name", "address", "type", "management", "earnings", or other suitable attribute. In some implementations business objects can be stored in memory 112. In other implementations, business objects can be stored in memory 148 (not illustrated). Business objects may also be stored remote to example environment 100 in a database, Web storage, file system, R/3 system, or other suitable storage system (not illustrated).

At least one business application 110 is illustrated within the visual analysis server 102. The business application 110 can be any application, program, module, process, or other software that may execute, change, delete, generate, or otherwise manage information associated with a particular visual analysis server 102, and in some cases, a business process performing and executing business process-related events. In particular, business processes communicate with other users, applications, systems, and components to send and receive events and/or data. In some implementations, a particular business application 110 may operate in response to and in connection with at least one request received from an associated client 140. Additionally, a particular business application 110 may operate in response to and in connection with at least one request received from other business applications 110, including a business application 110 associated with another visual analysis server 102. In some implementations, the business applications 110 may operate in parallel. In some implementations, each business application 110 may represent a web-based application accessed and executed by remote clients 140 via the network 130 (e.g., through the Internet, or via at least one cloud-based service associated with the visual analysis plugin 108). For example, a portion of a particular business application 110 may be a web service associated with the business application 110 that is remotely called, while another portion of the business application 110 may be an interface object or agent bundled for processing at a remote client 140. Moreover, any or all of a particular business application 110 may be a child or sub-module of another software module or enterprise application (not illustrated) without departing from the scope of this disclosure. Still further, portions of the particular business application 110 may be executed or accessed by a user working directly at the visual analysis server 102, as well as remotely at a corresponding client 140. Further, at least one business processes model (not illustrated) associated with a particular business application 110 may be stored, referenced, or executed either locally or remote from the visual analysis server 102. In some implementations the visual analysis server 102 may execute the business process models (not illustrated) using the at least one business application 110.

A visual analysis plugin 108 is illustrated within the visual analysis server 102. Although illustrated as a single visual analysis plugin 108 in the visual analysis server 102, two or more visual analysis plugins 108 may be used serially or in parallel in the visual analysis server 102 according to particular needs, desires, or particular implementations of example environment 100. The visual analysis plugin 108 can be any application, program, module, process, or other software that may provide methods for analyzing image information and transferring analyzed image information to at least one visual analysis module 111. Example visual analysis plugins 108 may analyze visual images of encoded binary representations (e.g., two or three-dimensional barcode, QR code, Data Matrix, DataGlyph, MaxiCode, ShotCode, stacked barcode), biometric data (e.g., facial, retina, and fingerprint), a visual image representation (e.g., digital photograph), or other suitable image information. Additionally, a particular visual analysis plugin 108 may operate in response to and in connection with at least one request received from other visual analysis plugins 108, including visual analysis plugins 108 associated with other visual analysis servers 102. In some implementations, each visual analysis plugin 108 can represent a Web-based application accessed and executed by remote clients 140 via the network 130 (e.g., through the Internet, or via at least one cloud-based service associated with the visual analysis plugin 108). For example, a portion of a particular visual analysis plugin 108 may be a Web service associated with a visual analysis plugin 108 that is remotely called, while another portion of the particular visual analysis plugin 108 may be an interface object or agent bundled for processing at a remote client 140. Moreover, any or all of a particular visual analysis plugin 108 may be a child or sub-module of another software module or enterprise application (not illustrated) without departing from the scope of this disclosure. Still further, portions of the particular visual analysis plugin 108 may be executed or accessed by a user working directly at the visual analysis server 102, as well as remotely at a corresponding client 140.

A visual analysis module 111 is illustrated within the visual analysis server 102. Although illustrated as a single visual analysis module 111 in the visual analysis server 102, two or more visual analysis modules 111 may be used in the visual analysis server 102 according to particular needs, desires, or particular implementations of example environment 100. The visual analysis module 111 can be any application, program, module, process, or other software that may provide methods for receiving image information, sending image information to at least one visual analysis plugin 108, analyzing image information returned from the at least one visual analysis plugin 108, retrieving business object 114 information corresponding to the analyzed image information, and transferring the retrieved business object 114 information to the at least one business application 110. In some implementations, the visual analysis module 111 can send image information to two or more visual analysis plugins 108 serially or in parallel, wait for responses from the two or more visual analysis plugins 108, and analyze the returned responses. In some implementations, two or more visual analysis plugins 108 receive the same image information from a visual analysis module 111 for analysis. In other implementations, two or more visual analysis plugins 108 each receive different image information from a visual analysis module 111 for analysis. In some implementations, the visual analysis module 111 transfers retrieved business object 114 information to multiple business applications 110 serially or in parallel. In some implementations, the visual analysis module 111 can modify retrieved business object 114 information. In some implementations, analysis of received image information is performed by the visual analysis module 111 exclusively or in conjunction with at least one visual analysis plugin 108. In some implementations, a particular visual analysis module 111 can operate in response to and in connection with at least one request and/or data received from an associated client 140. Additionally, a particular visual analysis module 111 may operate in response to and in connection with at least one request received from other visual analysis modules 111, including visual analysis modules 111 associated with other visual analysis servers 102. In some implementations, each visual analysis module 111 can represent a Web-based application accessed and executed by remote clients 140 via the network 130 (e.g., through the Internet, or via at least one cloud-based service associated with the visual analysis plugin 108). For example, a portion of a particular visual analysis module 111 may be a Web service associated with a visual analysis module 111 that is remotely called, while another portion of the particular visual analysis module 111 may be an interface object or agent bundled for processing at a remote client 140. Moreover, any or all of a particular visual analysis module 111 may be a child or sub-module of another software module or enterprise application (not illustrated) without departing from the scope of this disclosure. Still further, portions of the particular visual analysis module 111 may be executed or accessed by a user working directly at the visual analysis server 102, as well as remotely at a corresponding client 140.

In general, a client 140 is any computer device operable to connect or communicate with visual analysis server 102 using a wireless or wireline connection (i.e., network 130). In some implementations, visual analysis server 102 can be wholly or partially embedded within client 140. In particular, the client 140 may be embodied as a mobile or non-mobile computing device. At a high level, each client 140 can include a processor 144, a GUI 142, a visual reader application 146, a memory 148, an interface 150, and a camera 152. In general, the client 140 comprises an electronic computer device operable to receive, transmit, process, and/or store any appropriate data associated with a visual analysis server 102 or other suitable data source. In other implementations, client 140 may also have other sensors/interfaces (not illustrated) to provide additional data to associate with captured visual data to send to visual analysis server 102. Other sensors may include a thermometer, altimeter, light meter, accelerometer, radiation detector, barometer, Global Positioning System (GPS) interface, WiFI interface, cellular network interface, or other suitable sensor.

The GUI 142 of the client 140 is operable to allow the user of the client 140 to interface with at least a portion of the system 100 for any suitable purpose, including to allow a user of the client 140 to interact with at least one visual reader application 146 and the visual analysis plugin 108. In particular, the GUI 142 may provide users of the client 140 with a visualized representation of the visual reader application 146, visual analysis plugin 108, and other client 140 functionality. The GUI 142 may include a plurality of user interface elements such as interactive fields, pull-down lists, buttons, and other suitable user interface elements operable at the client 140.

In some implementations, processor 144 can be similar to processor 106 of the visual analysis server 102. In other implementations, the processor 144 may be a processor designed specifically for use in client 140. Further, although illustrated as a single processor 144, the processor 144 may be implemented as multiple processors in the client 140. Regardless of the type and number, the processor 144 executes instructions and manipulates data to perform the operations of the client 140, including operations to receive and process information from the visual analysis server 102 or other suitable data source, access data within memory 148, execute the visual reader application 146, as well as perform other operations associated with the client 140.

Similarly, memory 148 of the client 140 may include any memory or database module and may take the form of volatile or non-volatile memory including, without limitation, magnetic media, optical media, random access memory (RAM), read-only memory (ROM), removable media, or any other suitable local or remote memory component. For example, memory 148 may store a visual reader application 146, backup data, parameters, cookies, variables, algorithms, instruction, rules, or reference thereto. As illustrated, memory 148 can include any suitable components to interpret and decode messages received at the client 140. Further, although illustrated as a single memory 148, the memory 148 may be implemented as multiple memories in the client 140. The memory 148 may also store at least one business object instance (not illustrated) similar to the at least one business object 114 instance. Although illustrated as integral to client 140, memory 148 may also be physically or communicably connected to client 140. For example, memory 148 may be flash, optical, magnetic, or other suitable memory inserted into or connected to (e.g., by a cable) an interface port (not illustrated) on client 140.

The interface 150 of the client 140 may also be similar to the interface 104 of the visual analysis server 102 in that it may comprise logic encoded in software and/or hardware in a suitable combination and operable to communicate with the network 130. More specifically, interface 150 may comprise software supporting at least one communication protocol such that the network 130 or hardware is operable to communicate physical signals to and from the client 140. Further, although illustrated as a single interface 150, the interface 150 may be implemented as multiple interfaces in the client 140.

Camera 152 of the client 140 is operable to capture image information from sources external to client 140. In some implementations, camera 152 can use a lens assembly with a variable diaphragm to focus light onto an electronic image sensor and digitally record image information into memory 148 in various digital file formats. For example, digital file formats used to record the image information may be JPG, GIF, BMP, TIFF, PNG, AVI, DV, MPEG, MOV, WMV, RAW, or other suitable digital file format. In some implementations, the electronic image sensor can be a charge coupled device (CCD), an active pixel sensor (CMOS), or other suitable electronic image sensor. Camera 152 may provide a live preview of the external image source to be photographed. Camera 152 may also provide optical and/or digital zoom functionality and panoramic images in both two and three dimensions. In other implementations, the recorded image information can be both still and video with sound. In still other implementations, the camera 152 can geo-tag captured image information. Image information recorded by camera 152 may also be transferred over network 130 to a remote data storage location (not illustrated) instead of being stored in memory 148. Although illustrated as integral to client 140, camera 152 may also be physically or communicably connected to client 140. For example, camera 152 may be inserted into or connected to (e.g., by a cable) an interface port (not illustrated) on client 140.

As described above, client 140 may also have other sensors/interfaces (not illustrated) to provide additional data to associate with captured visual data to send to visual analysis server 102. Examples of additional data that may be gathered with the other sensors and transmitted to the visual analysis server 102 with image information may include location/time awareness (i.e., through the use of GPS, cellular network, and/or WiFi), altitude, temperature, atmospheric pressure, humidity, light levels, radiation levels, speed, and other suitable data.

The visual reader application 146 of the client 140 may provide a user interface for operation of camera 152, enhance the digitally recorded image information from camera 152, and/or transfer image information to the visual analysis server 102. In some implementations, visual reader application 146 can provide shutter-type controls to allow manual image information recording, automatic image information recording, image edge indications, light-level indications, and other suitable user interface functionality. In some implementations, visual reader application 146 can enhance digitally recorded image information with geo-tagging data, date, time, labels, and other suitable information to enhance recorded image information. In some implementations, visual reader application can transfer recorded image information via network 130. In other implementations, visual reader application 146 can combine image information from other visual reader applications 146 either local or remote to client 140 to create composite image information. Regardless of network connectivity, the visual reader application 146 may also cache several images on client 140 in order to allow functionality to store image information for later transmission to visual analysis server 102, improve performance by transmitting multiple requests simultaneously to visual analysis server 102, group requests (e.g., by product categories), or other suitable reasons. In some implementations, image information is fully retained on client 140 once transmitted to the visual analysis server 102 by visual reader application 146. In other implementations, all or a portion of the image information is deleted from client 140 once transmitted to visual analysis server 102.

While FIG. 1 is described as containing or being associated with a plurality of components, not all components illustrated within the illustrated implementation of FIG. 1 may be utilized in each implementation of the present disclosure. Additionally, at least one component described herein may be located external to example environment 100, while in other implementations, certain components may be included within or as a portion of at least one described component, as well as other components not described. Further, certain components illustrated in FIG. 1 may be combined with other components, as well as used for alternative or additional purposes, in addition to those purposes described herein.

Figure 2:
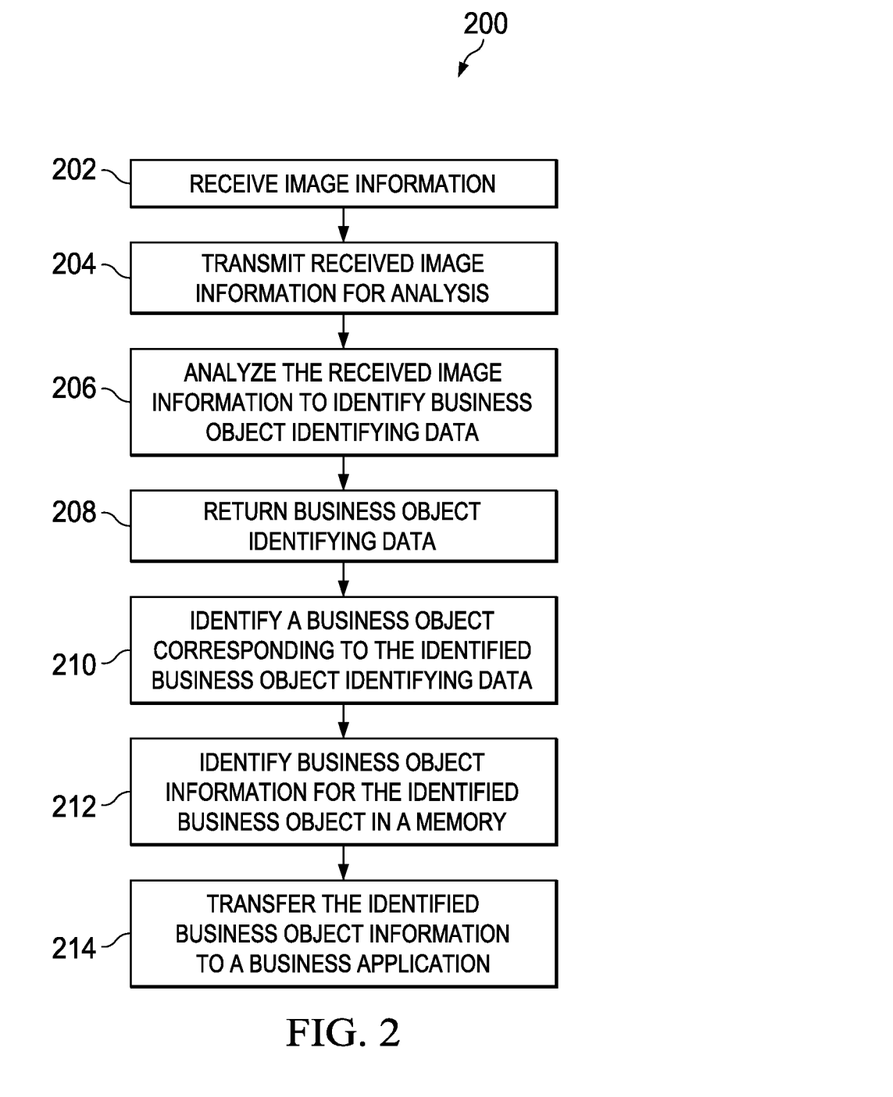
FIG. 2 is a flowchart of an example method for providing information to a business application using captured image information.

FIG. 2 illustrates a flowchart of an example method 200 for providing information to a business application using captured image information. For clarity of presentation, the description that follows generally describes method 200 in the context of FIG. 1. However, it will be understood that method 200 may be performed, for example, by any other suitable system, environment, or combination of systems and environments, as appropriate.

Referring now to FIG. 2, method 200 begins at 202. At 202, image information is received by the visual analysis server using a network. In some implementations, the image information is received by the visual analysis module. Image information may be, for example, an encoded binary representation (e.g., two or three-dimensional barcode, QR code, Data Matrix, DataGlyph, MaxiCode, ShotCode, stacked barcode, etc.), biometric data, a visual image representation (e.g., digital photograph), or other suitable image information. In some implementations, image information may be encapsulated in a custom data structure and/or encrypted. In some implementations, image information may be received as individual data sets or combined into multiple image information data sets for processing. Received image information may be stored either locally or remote from the visual analysis server. From 202, method 200 proceeds to 204.

At 204, the received image information is transmitted by the visual analysis module to at least one visual analysis plugin. In some implementations, the received image information can be transmitted to a plurality of visual analysis plugins which each analyze the received image information independently and in parallel. In other implementations, each visual analysis plugin of the plurality of visual analysis plugins can operate in conjunction with one or more visual analysis plugins to receive and/or process the image information. In other implementations, visual analysis plugins can communicate data between themselves to enhance receipt and processing of the image information. In an alternate implementation, the analysis of the received image information can be performed by the visual analysis module and the received image data is not transmitted to at least one visual analysis plugin. From 204, method 200 proceeds to 206.

At 206, the received image information is analyzed by the at least one visual analysis plugin to identify business object identifying data from the image information. In some implementations, the received image information is analyzed by a plurality of visual analysis plugins independently in serial and/or in parallel. In other implementations, each visual analysis plugin of the plurality of visual analysis plugins can operate in conjunction with one or more visual analysis plugins to analyze the image information. In other implementations, the received image information may be analyzed a single time and/or multiple times by each visual analysis plugin. In some implementations the analysis performed on the received image data is an image analysis. Examples of image analysis methods may include two and three-dimensional object recognition, image segmentation, motion detection, single particle tracking, video tracking, optical flow, medical scan analysis, three-dimensional pose estimation, automatic number plate recognition, biometric, and other suitable image analysis methods, whether proprietary or commercially available.

From the received image information, business object identifying data may be identified. For example:
Business Object Type=Company
CompanyID=1234
Company Name=Visual Analysis, Inc.
Phone number=111-222-3333
URL=www.visualanalysisinc.com In some implementations, the analysis may identify data that generically identifies a business object (e.g., business object type="company") followed by a specific instance of the business object type (e.g., CompanyID=1234). In other implementations, the analysis may only identify data that generically identifies a business object (e.g., business object type="yumcandybar"). Identified business object identifying data may be stored either locally or remote from the visual analysis server. From 206, method 200 proceeds to 208.

At 208, business object identifying data is transmitted to the visual analysis module. In some implementations, the business object identifying data can be transmitted either serially or in parallel. In some implementations, the business object identifying data may be pre-processed prior to transmitting the data to the visual analysis module. For example, the data may be compressed, encrypted/decrypted, converted to another data type, or other suitable pre-processing operation. From 208, method 200 proceeds to 210.

At 210, at least one business object is identified that corresponds to the identified business object identifying data. In some implementations, the identification of the at least one business object that corresponds to the identified business object identifying data is performed by the visual analysis module. For example, identifying the business object corresponding to the business object identifying data can be performed using a database query, a file system search, or other suitable search and match type operation. From 210, method 200 proceeds to 212.

At 212, business object information for the identified at least one business object is identified in a memory. In some implementations, the retrieval of the business object information for the identified at least one business object from the memory is performed by the visual analysis module. In some implementations, the business object information for the identified at least one business object can be retrieved from multiple memories, either local or remote to the visual analysis server. Retrieved business object information may be stored in memories either local or remote from the visual analysis server. From 212, method 200 proceeds to 214.

At 214, the identified business object information is transferred to at least one business application. In some implementations, the transfer of the business object information to the at least one business application is performed by the visual analysis module. In some implementations, the retrieved business object information is transferred to two or more business applications for serial and/or parallel processing. From 214, method 200 ends.

Figure 3:
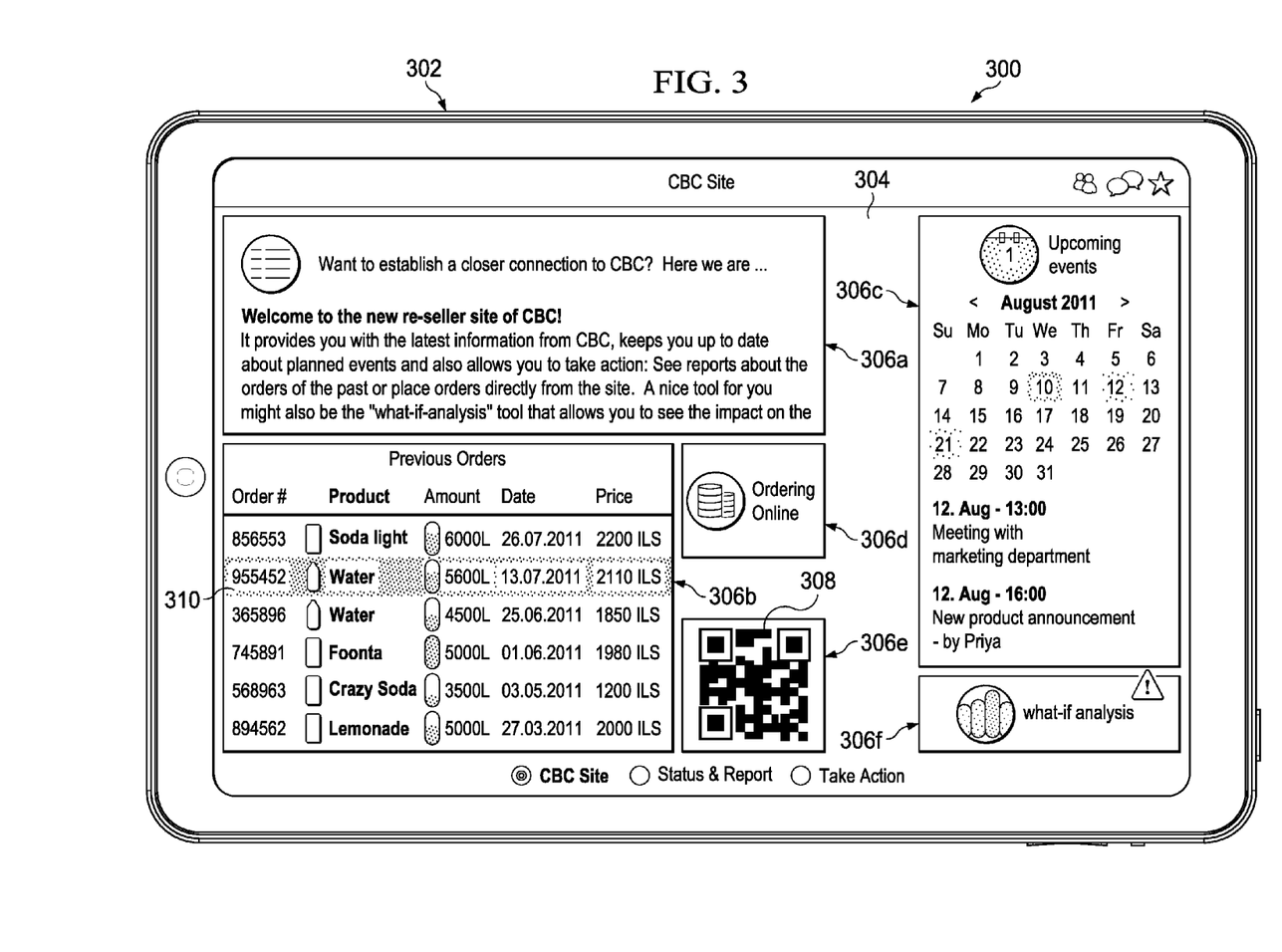
FIG. 3 is an example portal user interface displayed by a mobile device.

Referring now to FIG. 3, an example portal user interface displayed in mobile device is shown. A mobile device 302 (i.e., a tablet-type computer) is shown displaying and providing access to a client user interface 304 for a Web-accessed enterprise portal containing several business applications 306a-306f. As illustrated, a visual reader application 306e has captured a QR code 308 displayed on some type of material (not illustrated). For example, the QR code 308 may be displayed on a hardcopy printout of an invoice. QR code 308 image information is transmitted to a visual analysis server (not illustrated). At the visual analysis server, the QR code 308 image information is analyzed to identify business object identifying data, and business object information corresponding to the business object identifying data is transmitted to a business application 306b. For example, the business object information corresponding to the QR code 308 may be a sales order, such as sales order 310 shown highlighted in business application 306b. In this example, a Web-accessed ordering application 306d may also be displayed to allow a user to issue a new sales order identical to sales order 310.

An example implementation consistent with the present disclosure can include a system, method, and/or computer-program product to perform a parallel check of records in multiple computer systems in order to establish the identity of a person filing a credit request at a financial lending institution. In this implementation, identifying data, such as social security number, credit information, criminal history, address, phone number, email, and other suitable identifying data may be retrieved following an analysis of biometric data, such as a photograph, digital fingerprint scan, or other suitable biometric data. The retrieved identifying data may then be processed in parallel by the multiple computer systems in order to authenticate the identity of the person and to determine the person's credit worthiness.

In another example implementation consistent with the present disclosure, a system, method, and/or computer-program product can perform a parallel check of records in multiple computer systems in order to identify an item. In this implementation, records can be previous orders, sales orders, substitute material orders, manufacturer details, supply chain links, and other suitable records. The records may be retrieved following an analysis of visual data of the item, a barcode associated with the item, or other suitable visual data. The retrieved records may then be processed in parallel by the multiple computer systems in order to determine the item's identity.

In still another example implementation consistent with the present disclosure, a system, method, and/or computer-program product can provide a virtual shopping cart that can have items added by capturing visual data associated with each item, such as a photograph, a barcode, or other suitable visual data. In this implementation, an action can be taken on the items in the virtual shopping cart, such as placing an order for one or more items, requesting a recommendation for a similar but less expensive item to replace an item, or other suitable action.

In yet another example implementation consistent with the present disclosure, a system, method, and/or computer-program product can provide the ability to find all instances of a document cited in a set of existing records. For example, all references to a specific invoice or a sales order may be searched within an organization's databases in order to establish where the specific invoice or sales order is referenced in the organization's documents. In this implementation, the document of interest may have a barcode or other suitable visual data printed upon it which may be captured in order to provide a unique identifier to be processed. Other implementations consistent with the present disclosure are also possible.

The preceding figures and accompanying description illustrate example processes and computer implementable techniques. But example environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the steps in these processes may take place simultaneously, concurrently, in parallel, and/or in different orders than as shown. Moreover, example environment 100 may use processes with additional steps, fewer steps, and/or different steps, so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method for providing information to a business application using captured image information, comprising:
   receiving image information visually encoded in an image, wherein the received image information is encoded with business object identifying data for identification of at least one business object for use by at least one business application;
   analyzing, by a computer, the received image information to identify the business object identifying data;
   identifying, by a computer, business object information associated with the at least one business object corresponding to the identified business object identifying data; and
   transmitting the identified business object information to the at least one business application.

2. The computer-implemented method of claim 1, wherein the image information is received from a mobile image capture device.

3. The computer-implemented method of claim 1, wherein the image information is at least one of an encoded binary representation, biometric data, or a visual image representation.

4. The computer-implemented method of claim 1, wherein the analysis is performed by at least one visual analysis plugin.

5. The computer-implemented method of claim 4, wherein the analysis is performed in parallel.

6. The computer-implemented method of claim 1, wherein the received image information is analyzed using an image analysis.

7. The computer-implemented method of claim 6, wherein the image analysis is at least one of two and three-dimensional object recognition, image segmentation, motion detection, single particle tracking, video tracking, optical flow, medical scan analysis, three-dimensional pose estimation or automatic number plate recognition.

8. The computer-implemented method of claim 1, further comprising matching at least one business object in a memory using the identified business object identifying data.

9. The computer-implemented method of claim 1, wherein the at least one business object represents a type of entity inside a business layer in an n-layered object-oriented architecture, the type of entity holding a set of attributes, methods, and associations with other business objects.

10. A computer-program product for providing information to a business application using captured image information, the computer program product comprising computer-readable instructions embodied on tangible, non-transitory media, the instructions operable when executed to:
    receive image information visually encoded in an image, wherein the received image information is encoded with business object identifying data for identification of at least one business object for use by at least one business application;
    analyze the received image information to identify the business object identifying data;
    identify business object information associated with the at least one business object corresponding to the identified business object identifying data; and
    transmit the identified business object information to the at least one business application.

11. The computer-program product of claim 10, wherein the image information is received from a mobile image capture device.

12. The computer-program product of claim 10, wherein the image information is at least one of an encoded binary representation, biometric data, or a visual image representation.

13. The computer-program product of claim 10, wherein the analysis is performed by at least one visual analysis plugin.

14. The computer-program product of claim 13, wherein the analysis is performed in parallel.

15. The computer-program product of claim 10, wherein the received image information is analyzed using an image analysis, the image analysis at least one of two and three-dimensional object recognition, image segmentation, motion detection, single particle tracking, video tracking, optical flow, medical scan analysis, three-dimensional pose estimation or automatic number plate recognition.

16. The computer-program product of claim 10, further comprising matching at least one business object in a memory using the identified business object identifying data.

17. The computer-program product of claim 10, wherein the at least one business object represents a type of entity inside a business layer in an n-layered object-oriented architecture, the type of entity holding a set of attributes, methods, and associations with other business objects.

18. A system for providing information to a business application using captured image information, comprising:
    memory operable to store image information; and
    at least one hardware processor interoperably coupled to the memory and operable to:
        receive image information from an image, wherein the image information is encoded with business object identifying data for identification of at least one business object;
        receive image information visually encoded in an image, wherein the received image information is encoded with business object identifying data for identification of at least one business object for use by at least one business application;

analyze the received image information to identify the business object identifying data;

identify business object information associated with the at least one business object corresponding to the identified business object identifying data; and transmit the identified business object information to the at least one business application.

19. The system of claim 18, wherein the image information is received from a mobile image capture device.

20. The system of claim 18, wherein the image information is at least one of an encoded binary representation, biometric data, or a visual image representation.

21. The system of claim 18, wherein the analysis is performed in parallel.

22. The system of claim 18, further comprising matching at least one business object in a memory using the identified business object identifying data.

23. The system of claim 18, wherein the at least one business object represents a type of entity inside a business layer in an n-layered object-oriented architecture, the type of entity holding a set of attributes, methods, and associations with other business objects.

* * * * *